Patented Aug. 13, 1929.

1,724,680

UNITED STATES PATENT OFFICE.

PERRY C. RIPLEY, OF CHICAGO, ILLINOIS, ASSIGNOR TO KESTER SOLDER COMPANY, OF CHICAGO, ILLINOIS, A CORPORATION OF ILLINOIS.

ROSIN-CORE SOLDER.

No Drawing.   Application filed February 4, 1927.  Serial No. 166,017.

This invention relates to solder tubes or soldering wire having a suitable flux core. In operation when heat is applied to the solder strand the melting of the solder liberates the contained flux in correctly pre-determined proportions upon the surfaces where solder adhesion is required. This type of solder is old and well known to artisans and is illustrated, for example, in the patent to Kester, No. 628,541 granted July 11, 1899.

In solder of this type various kinds of flux cores have been employed, and the present invention relates particularly to an improvement in rosin core solder.

All rosin cored solders in the past have been produced in substantially the same manner since its innovation and it is characteristic for the rosin core to take the form of a finely divided and powdered state, the cause thereof being due to natural causes and the sequence of events in the manufacturing. For example: To facilitate the introduction of the rosin within the restraining wall of the solder tube, it is converted from solid state to that of molten fluidity by the application of heat. It must be remembered that in this conversion from solid to fluid that the volume of the rosin is considerably increased, more commonly spoken of as expansion from heat. Following its introduction within the solder it cools and passes from molten fluidity to solid state with the resultant accompanying contraction of such volume. In this change of state from molten fluidity to solid there results a fracturing of the rosin body under the unequalled exertion of the force of contraction and the restraining force of capillary adhesion to the solder wall. In the subsequent operations of preparing the commodity for sale, such as inspection, reeling, spooling and general handling the column of rosin naturally being very brittle is completely pulverized. Moreover, the contraction of the mass creates a vacuum in this capillary tube with the result that air and moisture is drawn into the pulverized column of the rosin core. Then starts a de-composition of this rosin which has troubled producers of rosin cored solders ever since its invention.

The powdered or pulverized rosin within the solder wall or tube continues to deteriorate or decompose under the attack of atmosphere and moisture until in a short space of time deterioration is complete. The rosin is then in a state which renders it unfit as a fluxing medium, causes its rejection by the purchaser and results in a source of great trouble to the manufacture. Deterioration thus defeats the object of a cored solder, namely, to supply an efficient flux in correctly proportional amounts as soldering progresses.

It is obvious that a porous mass of pulverized rosin such as the conventional type of rosin cored solder contains is not in a physical state that would lend itself to defeat the attack of air and moisture.

An object of the invention is to provide a rosin core solder in which the core does not deteriorate and will keep for relatively long periods as compared to the relatively short life of the ordinary rosin solder in which the core is a dry pulverized mass of rosin.

The invention contemplates the provision of a rosin flux for a core having a substantially permanent plastic form, as distinguished from the dry powdered-like form of the ordinary rosin core solder. It has been found that a plastic column or core of rosin, when expanded by heating and subsequently contracted during cooling, will move within the solder casing or walls without fracturing its continuity, and thus maintain its homogeneous character which prevents penetration of the air and other destructive elements. This column of plastic rosin yields to any stress or strain such as is caused by bending, flattening or crimping of the solder tube, or handling or spooling operations. Since the plastic mass cannot fracture, the ends of the column effectively seal the entire tube.

The rosin is rendered plastic by the use of a suitable plasticiser or solvent, such as turpentine, kerosene, gasoline, naphtha, alcohol, chloroform, acetone, ether, carbon-disulphide or ethyl-acetate. Any of these plasticisers or solvents are suitable, but for general use, turpentine has been found to be the one best adapted to produce a suitably permanent plastic core of rosin. Turpentine is particularly well suited for use as a solvent in rosin fluxes for the reason that it is relatively not so volatile at soldering temperatures as other solvents that might be used and for the further reason that it is a non-conductor of electricity. The core consists merely of rosin mixed with a suitable percentage of turpentine or other plasticiser. The percentage of solvent or plasticiser employed will vary with different grades of rosins, since rosins contain varying percentages of fluids, and, consequently, the amount of solvent necessary will vary considerably. It will ordinarily be found, however, that from 2% to 50% of turpentine by weight depending upon the grade of rosin treated, will obtain the desired result.

The mixture is preferably obtained by melting the rosin in a suitable container, and when the rosin is rendered fluid, adding the required amount of solvent or plasticiser. The rosin and turpentine, for instance, are mechanically agitated to obtain a thorough penetration of the turpentine through the rosin mass. If desired, the solvent may be introduced during the melting process since it is not necessary to wait until the rosin has reached a thoroughly fluid state before mixing. As will be understood, of course, after a thorough mechanical mixture has been obtained, it is introduced into the solder tube or wire.

When a rosin flux made in accordance with the foregoing description is encased within the solder tube or wire, it is maintained therein in plastic form substantially permanently due to the fact that the solvent employed in rendering the rosin plastic is prevented from evaporating by the walls of the solder tube or wire completely enclosing the flux core, so that regardless of changes of temperature of the rosin plastic mass, decomposition and crystallization of the rosing core is precluded, and it is maintained in the correct state of plasticity to spread and cover the surface to be coated exactly in the proper degree and proportion to the amount of the solder tube melted.

I claim:

1. A self-fluxing solder comprised of a hollow solder member and a core of rosin-containing material in a substantially permanently plastic form completely filling said hollow member and sealing the interior thereof against the ingress of air and moisture.

2. A self-fluxing solder comprised of a hollow solder member and a core of rosin mixed with a solvent therefor in a substantially permanently plastic form completely filling said hollow member and effectively sealing the interior thereof against the ingress of air and moisture.

3. A self-fluxing solder comprised of a tubular solder member having a continuous core formed of rosin mixed with turpentine, said core being in a substantially permanently plastic form and completely filling and sealing the interior of said tubular solder member.

4. A self-fluxing solder comprised of a tubular solder member having a continuous core formed of rosin mixed with turpentine in the proportion of between 2 and 50% of turpentine by weight of the mixture, said core being in a substantially permanently plastic form and completely filling and sealing the interior of said tubular solder member.

5. A self-fluxing solder comprising a hollow solder member having a continuous plastic core comprising rosin as the principal active fluxing agent and a solvent for the rosin adapted to render the rosin substantially permanently plastic in form.

6. A self-fluxing solder comprising a hollow solder member having a continuous plastic core comprising rosin as the principal active fluxing agent and turpentine in such proportion as to render the rosin substantially permanently plastic in form.

In testimony whereof I have hereunto set my hand.

PERRY C. RIPLEY.